(12) United States Patent
Liu

(10) Patent No.: US 9,731,785 B1
(45) Date of Patent: Aug. 15, 2017

(54) TILTABLE ELECTRIC TRICYCLE

(71) Applicant: Yongbiao Liu, Salinas, CA (US)

(72) Inventor: Yongbiao Liu, Salinas, CA (US)

( * ) Notice: Subject to any disclaimer, the term of this patent is extended or adjusted under 35 U.S.C. 154(b) by 0 days.

(21) Appl. No.: 15/174,947

(22) Filed: Jun. 6, 2016

(51) Int. Cl.
*B62K 5/10* (2013.01)
*B62K 5/027* (2013.01)
*B62K 5/06* (2006.01)
*B62K 21/02* (2006.01)
*B62J 25/00* (2006.01)
*B62K 19/18* (2006.01)

(52) U.S. Cl.
CPC ............. *B62K 5/10* (2013.01); *B62J 25/00* (2013.01); *B62K 5/027* (2013.01); *B62K 5/06* (2013.01); *B62K 19/18* (2013.01); *B62K 21/02* (2013.01)

(58) Field of Classification Search
CPC .......... B62K 5/10; B62K 5/027; B62K 19/18; B62K 21/02; B62K 5/06; B62J 25/00
See application file for complete search history.

(56) References Cited

U.S. PATENT DOCUMENTS

| | | | |
|---|---|---|---|
| 3,504,934 A * | 4/1970 | Wallis | B62K 5/02 180/217 |
| 3,513,926 A * | 5/1970 | Paget, Jr. | B62K 15/006 180/208 |
| 3,605,929 A | 9/1971 | Rolland | |
| 4,279,429 A | 7/1981 | Hopkins et al. | |
| 4,437,535 A | 3/1984 | Winchell et al. | |
| 4,453,616 A | 6/1984 | Porter | |
| 4,634,137 A | 1/1987 | Cocksedge | |
| 4,678,053 A | 7/1987 | Watanabe et al. | |

(Continued)

*Primary Examiner* — Darlene P Condra

(57) ABSTRACT

A tiltable electric tricycle as in the present invention comprises: (a) a frame, (b) a front fork mounted to the frame, (c) a front wheel with hub motor mounted to the front fork, (d) a seat, (e) a steering handle bar, (f) a pair of laterally spaced rear wheels on a common axle, (g) a support base with two quick release clamps for securing the axle of the rear wheels and the base has a shaft tube fitted into the bottom tube of the frame to connect to the frame rotatably, (h) a pair of footrests, (i) a battery to power the hub motor; furthermore the bottom tube points to the ground contact point of the front wheel; furthermore the frame has a horizontal oriented metal plate at the rear end of the bottom tube positioned above the support base of the rear wheels; and when the frame is tilted relative to the rear wheel support base to a certain extent, an end of the metal plate touches the rear wheel support base and thereby restricts the extent the frame can tilt; furthermore the axle of the rear wheels is secured to its support base using two quick release clamps and can be released quickly from the quick lease clamps so that the axle with two rear wheels can be separated from the rest of the tricycle for easy transportation; furthermore the two footrests are rotatably connected to the base and can swing toward the rear of the tricycle to reduce the width of the tricycle. In operation, the rider of the tricycle seats on the seat with two feet stepping on the footrests of the rear frame to keep balance and can tilt the front part of the tricycle around the axis line to maintain balance in response to road condition, speed, or turning while the rear part with two rear wheels remain stable.

6 Claims, 7 Drawing Sheets

(56) References Cited

U.S. PATENT DOCUMENTS

| | | | |
|---|---|---|---|
| 4,903,857 A * | 2/1990 | Klopfenstein | B62K 5/05 280/267 |
| 5,240,267 A | 8/1993 | Owsen | |
| 6,367,824 B1 * | 4/2002 | Hayashi | B62K 5/05 280/124.103 |
| 6,817,617 B2 * | 11/2004 | Hayashi | B62K 5/05 280/124.1 |
| 7,073,806 B2 * | 7/2006 | Bagnoli | B62K 5/05 180/210 |
| 7,762,368 B2 * | 7/2010 | Matthies | B60G 21/007 180/210 |
| 7,887,070 B2 | 2/2011 | Kirchner | |
| 8,141,890 B2 * | 3/2012 | Hughes | B60G 21/007 180/210 |
| 8,292,315 B1 * | 10/2012 | Pelkonen | B62K 5/06 280/266 |
| 8,596,660 B2 * | 12/2013 | Hsu | B62K 5/025 180/210 |
| 8,789,639 B2 | 7/2014 | Mimura | |
| 2009/0289437 A1 | 11/2009 | Steinhilber | |
| 2010/0206652 A1 * | 8/2010 | Kielland | B62J 25/00 180/220 |
| 2011/0148052 A1 * | 6/2011 | Quemere | B60G 17/005 280/6.15 |
| 2013/0161919 A1 * | 6/2013 | Gaillard-Groleas | B60G 21/007 280/124.103 |
| 2013/0181420 A1 * | 7/2013 | Hsu | B62K 5/10 280/93.502 |
| 2015/0054252 A1 * | 2/2015 | Lee | B62K 5/025 280/276 |
| 2015/0175184 A1 | 6/2015 | Yadan | |
| 2016/0096574 A1 * | 4/2016 | Liu | B62K 5/027 180/214 |

* cited by examiner

TILTABLE ELECTRIC TRICYCLE

BACKGROUND OF THE INVENTION

1. Field of the Invention

The present invention relates to a personal transportation device; and more particularly the present invention relates to compact tiltable tricycle that can tilt safely and can be quickly disassembled for easy transport.

2. Description of the Related Art

Transportation devices such as tricycles that can tilt freely like bicycle and can be quickly disassembled for easy transport in cars make them safer to ride and more useful. There are several prior arts disclosing a variety of mechanisms to tilt including U.S. Pat. Nos. 3,605,929, 3,995,875, 4,437,535, 4,453,616, 4,634,137, 4,678,053, 4,903,857, 5,240,267, 5,730,453, 6,328,125, 7,073,806, 7,762,368, 7,878,522, 8,292,315, 8,613,340, 8,762,003, 8,893,833. All these prior arts differ significantly from the present invention in a variety of ways. In these specific inventions, elaborate mechanisms are used to achieve tilting of the tricycles. Therefore, a simple mechanism of achieving the tilting will be desirable for widespread of adaptation of tricycles as a common personal transportation tool.

SUMMARY OF THE INVENTION

The primary objective of the current invention is to provide a tiltable and compact electric tricycle that is not only easy to ride but also has a mechanism to ensure safety when turning and a mechanism to quickly detach rear wheels for easy transport. It is another objective of the present invention to provide a personal transportation tool which is compact and portable, has a low production cost, and suitable to meet the normal commuting and other travel needs.

To achieve these objectives, the portable electric tricycle as in the present invention comprises a front frame, a front fork, a front wheel with a hub motor, a steering bar, a seat, a rear frame, one pair of laterally spaced rear wheels connected to the rear frame, a pair of footrests connected to the rear frame, and a mechanism to rotationally connect the front frame with the rear frame. The front frame has a head tube at the front to be connected rotationally to the front fork and the steering bar, a top tube, a down tube, a seat tube to support the seat, and bottom tube at the low rear position. The bottom tube aligns along an axis line pointing forward to the ground contact point of the front wheel. The rear frame comprises a horizontally positioned elongated support element for support of a common axle of the two rear wheels and a shaft tube fixed perpendicularly to the middle of the elongated support element. The two rear wheels are installed at the two ends of the axle, and the axle is connected to the elongated support element with two quick release clamps. Thereby, the axle with the wheels can be quickly detached from the rest of the tricycle for easy transport. The shaft tube fits into the bottom tube of the front frame rotationally so that the front frame along with the front wheel and steering bar can tilt relative to the rear frame and the rear wheels. The two footrests connect to a common base positioned and connected to the front end of the shaft tube of the rear frame. Furthermore the base of the footrests is removable from the front of the shaft tube. The two footrests are rotationally connected to the base and can swing backward to be positioned next to the bottom tube of the front frame. The tricycle further comprises a battery as a power source. When in operation, the rider of the tricycle rests on the seat with two feet stepping on the footrests, and can adjust the gravity center by tilting the front part and using two feet on the footrests for support. The tricycle further comprises a mechanism to limit the extent of tilting and the mechanism comprises a metal plate at the rear end of the front frame oriented horizontally and transverse to the longitudinal axis of the tricycle body and positioned directly above the elongated support element on the rear frame for the axle of the rear wheels. When the front frame is tilted to a certain extent, one end of the plate at the end of the front frame touches the elongated support element of the rear frame and thereby the front frame could not be tilted further. The tricycle further comprises a plurality of locking mechanisms to keep the front frame at a fixed upright position relative to the rear frame when it is parked. One of the plurality of the locking mechanisms comprises a post at one end of the support base for the axle and a rotatable top on the post with two extended metal pieces at different heights. To lock the front frame to an upright position, the top is turned to have the end of the horizontal metal plate of the front frame sandwiched between the two extended metal pieces. Another of the plurality of mechanisms to lock the front frame to an upright position comprises two compression springs positioned between the metal plate at the end of the front frame and the elongated support element of the rear frame. Still another of the plurality of the mechanisms to lock the front frame to an upright position comprises two rotatable objects on two posts at the two ends of the elongated support element of the rear frame. The rotatable objects can be turned in parallel to the metal plate of the front frame and thereby positioned below the metal plate at both ends and the front frame thereby is locked at an upright position. For maximum compactness and easy transport, the distance between the two rear wheels is small ranging from 12 to 20 inches.

The present invention can have several preferred embodiments. For example, the motor and the power source can have different locations and types. The tricycle may also comprise a throttle on the steering bar to accelerate and regulate speed and a controller which is connected to the battery and the throttle to achieve the control of the electric motor.

The present invention has advantages of being simple in mechanism and structure, and therefore being easy to manufacture at a low cost. Motorcycles and electric bikes have become popular transportation tools because they are environmental friendly, cost less than cars to own and operate. However, they carry high risks of traffic accident as they are prone to fall when tires loose traction with ground. The tiltable electric tricycle as in the present invention provides a safer alternative to two wheeled vehicles and a more affordable and easy to use alternative to other types of tricycles.

Furthermore, the described features and specifications may be combined in any suitable manner in one or more embodiments. One skilled in the relevant art will recognize that the invention can be practiced without one or more of the specific features or advantages of a particular embodiment.

DETAILED DESCRIPTION

Figure 1:
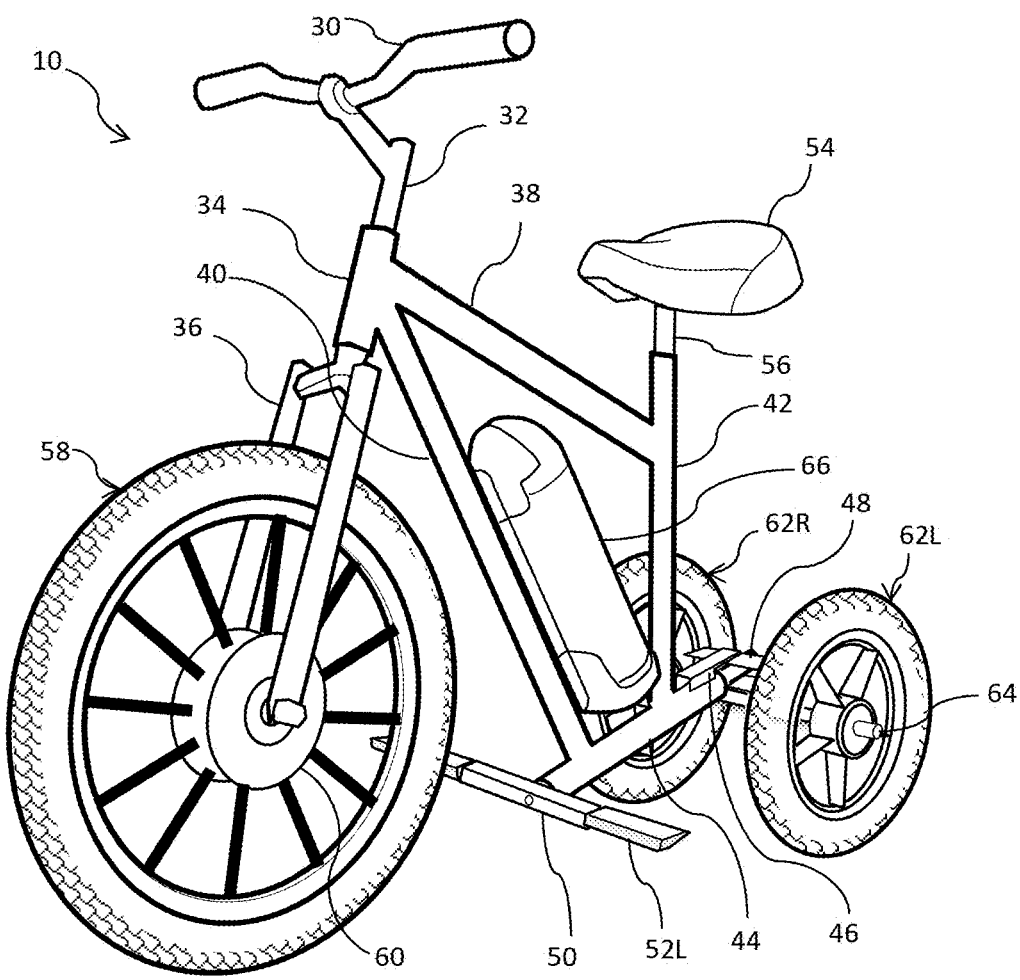
FIG. 1 is a perspective view of a preferred embodiment of the present invention.

With reference to FIG. 1 for the preferred embodiment 10, the portable electric tricycle of the current invention comprises a front frame with a head tube 34, a top tube 38, a down tube 40, a seat tube 42, a bottom tube 44 and a horizontal metal plate 48 and its base 46 at the rear end of the bottom tube 44, a front fork 36, a front wheel 58 with a hub motor 60, a steering handle bar 30, and a seat 54 with a seat post 56, a pair of rear wheels 62L, 62R on a common axle 64, a battery 66.

Figure 2:
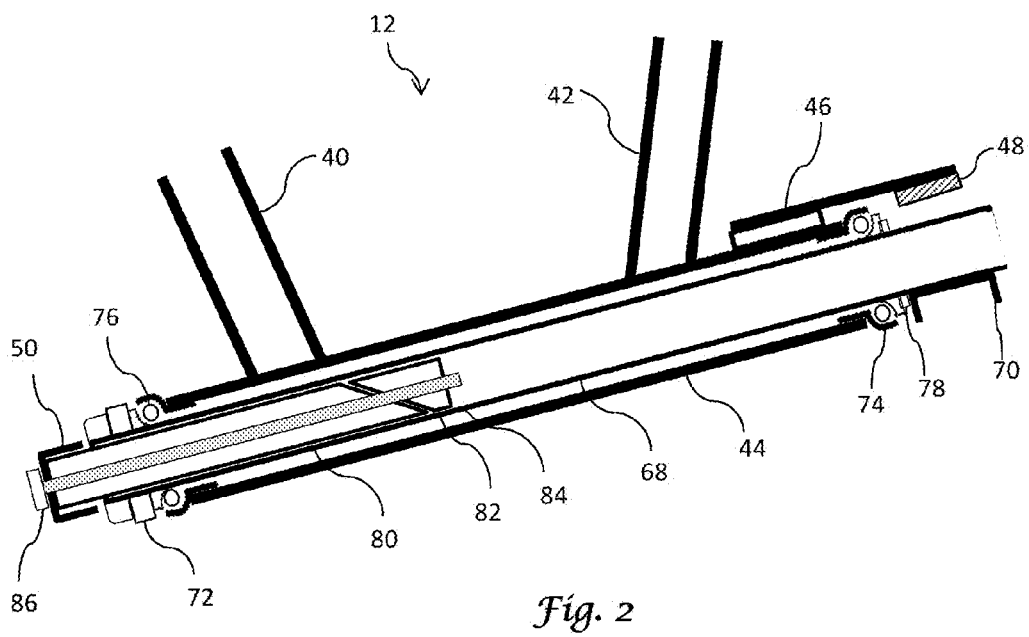
FIG. 2 is a side dissection view of the bottom tube of the preferred embodiment of the present invention showing a vertical cross section along the longitudinal axis.

With reference to FIG. 2 for the side view 12 of cross section along the longitudinal axis of the bottom tube 44 of the front frame, the shaft tube 68 of the rear frame is inserted into the bottom tube 44 and has a horizontally oriented U-channel support element 70 of the rear frame for rear wheels. The shaft tube 68 also has a support collar 78 to support a bearing bowl set comprising bowls 74, bearings 76, and nuts 72 for rotationally connecting the shaft tube 68 with the bottom tube 44. The bottom tube 44 has the support base 46 and the horizontal metal plate 48 at the rear end.

Figure 3:
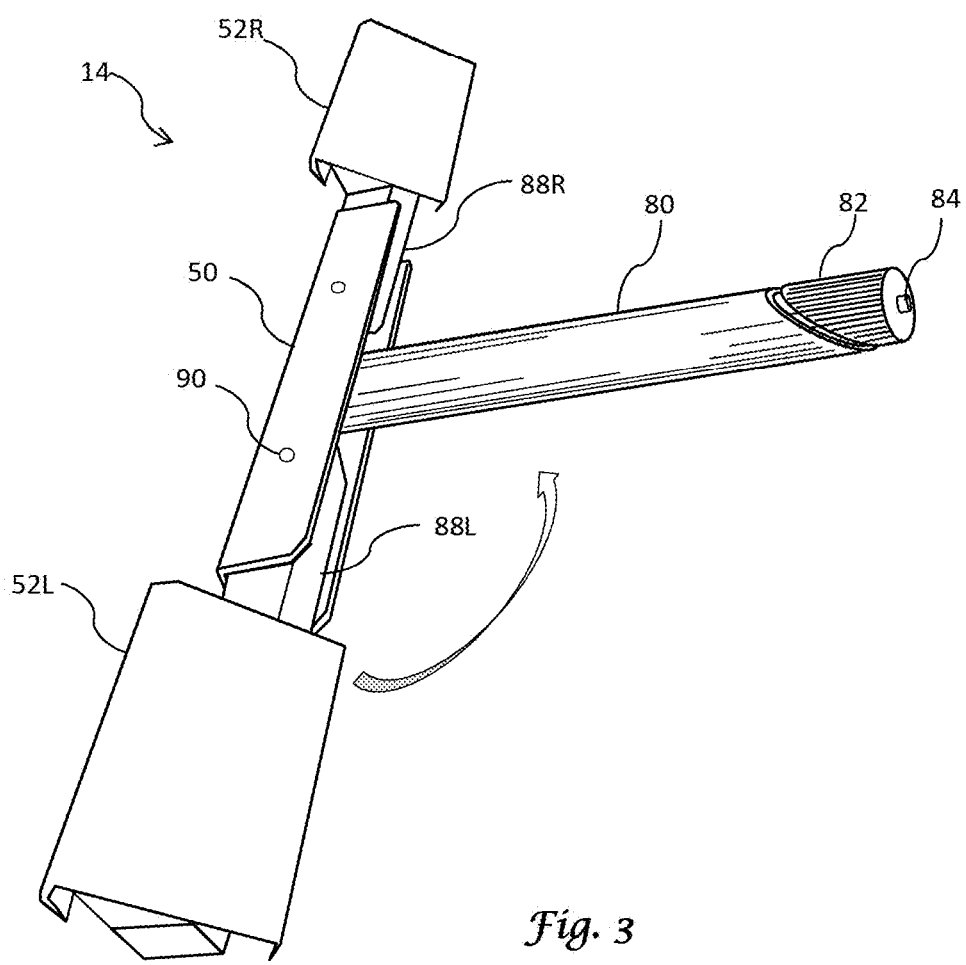
FIG. 3 is a perspective view of the footrests and their support structures of the preferred embodiment of the present invention.
Figure 4:
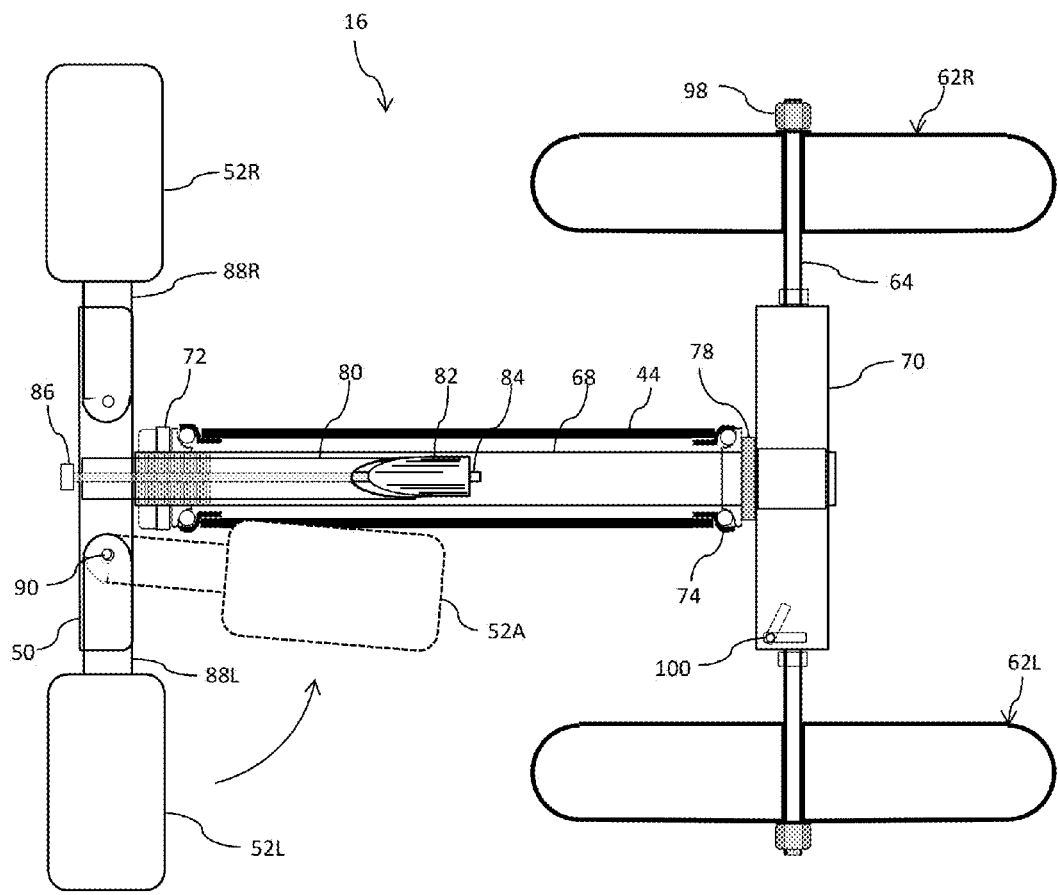
FIG. 4 is a top dissection view of the preferred embodiment of the present invention showing a horizontal cross section along the longitudinal axis of the bottom tube.

With references to FIGS. 2 and 3, the tricycle has two footrests 52L, 52R on stems 88L, 88R respectively which are rotationally connected to a support base 50, and the base has a quill stem 80 inserted into and locked to the shaft tube 68 with a locking wedge 82 and a threaded rod 84. FIG. 4 further illustrates connections of different parts of the preferred embodiment of the tricycle 16. The left footrest 52L on the stem 88L at a spread position rotates around a locking pin 90 to a fold-back position 52A next to the bottom tube 44. The axle 64 is positioned underneath the U-channel support base 70. Two rear wheels 62L, 62R are placed at two ends of the axle 64 and locked to the positions by two nuts 98. A rotatable element 100 is attached to the top of the U-channel support base 70.

Figure 5:
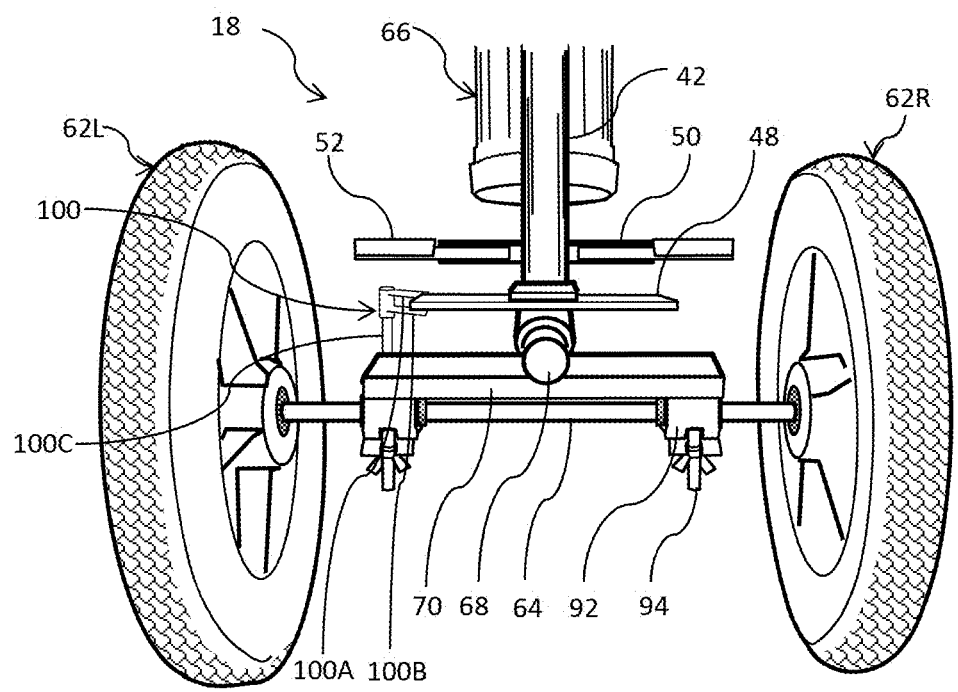
FIG. 5 is a rear view of the preferred embodiment of the present invention showing the parallel position of the rear plate of the front frame with the metal plate of the rear frame for supporting the axle of the rear wheels and clamping of the axle with the quick releasing clamps underneath the supporting metal plate and a locking element to lock the front frame at an upright position.

With reference to FIG. 5 for a rear view 18 of the preferred embodiment 10 of the present invention, the metal plate 48 at the rear end of the front frame is positioned above the U-channel support base 70 for the axle 64 and the attached wheels 62L, 62R. The axle 64 is attached to the U-channel support base 70 by two quick releasing clamps 92 at the two ends of the base 70. The quick release clamp 92 has a threaded stem 94 with a butterfly nut to secure the axle 64 in the clamp 92. The rotatable element 100 has a stem 100C attached to the support base 70 and has a rotatable top with a high plate 100A and a low plate 100B and one end of the metal plate 48 of the front frame is locked between the upper and the lower plate of the element 100 to lock the front frame to an upright position when the tricycle is parked.

Figure 6:
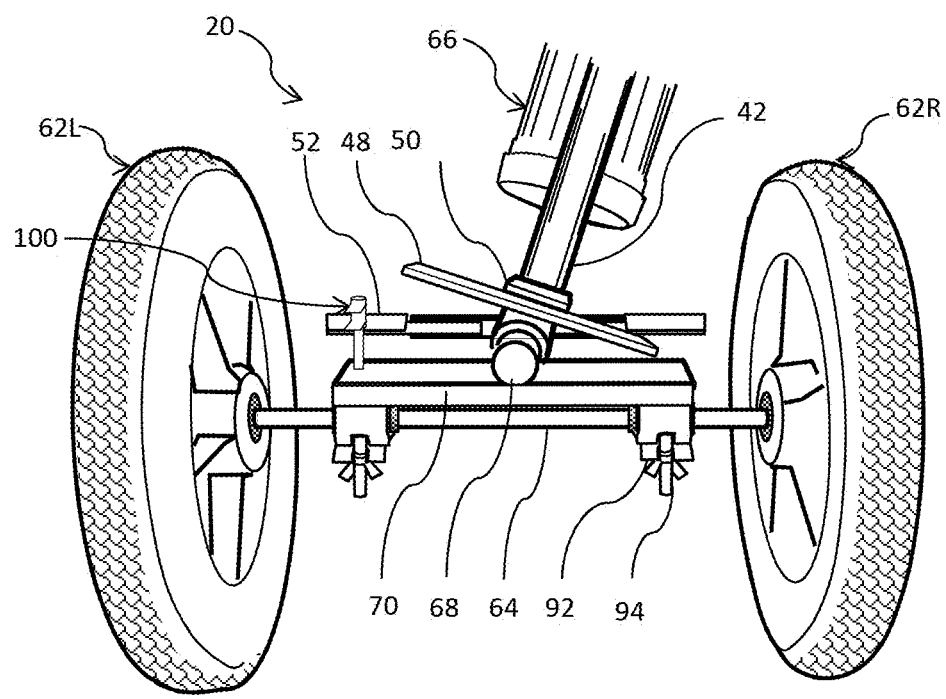
FIG. 6 is a rear view of the preferred embodiment of the present invention showing a tilted position of the front frame and the rear plate of the front frame and the rear plate nearly in touch with the metal plate of the rear frame for supporting the axle of the rear wheels and clamping of the axle with the quick releasing clamps underneath the supporting metal plat.

With reference to FIG. 6 for a rear view 20 of the preferred embodiment 10 of the current invention, when the front frame tilts, the metal plate 48 at the end of the front frame also tilts and the tilting can only go far when the metal plate 48 is in touch with the support base 70. The rotatable element 100 has its top turned clear from the metal plate 48 of the front frame when the tricycle is in motion.

Figure 7:
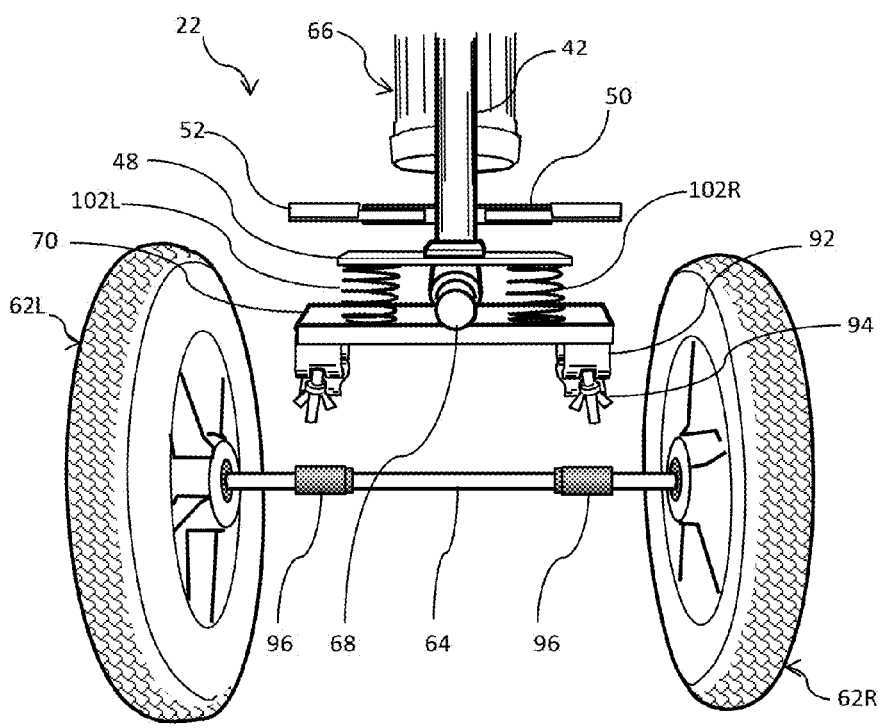
FIG. 7 is a rear view of the preferred embodiment of the present invention showing the parallel position of the rear plate of the front frame with the metal plate of the rear frame for supporting the axle of the rear wheels with added compression springs between them and detachment of the axle with the rear wheels from the quick releasing clamps.

With reference to FIG. 7, a rear view 22 of the tricycle shows the detachment of the axle 64 with two rear wheels 62L, 62R from the quick release clamps 92 on the support base 70 of the rear frame. The axle 64 also has two cushion bands 96 for better fitting into the clamps 92 to be secured. Two compression springs 102L and 102R are positioned between the metal plate 48 and the U-channel support base 70 to keep the front frame at an upright position relative to the rear frame.

The invention claimed is:

1. A tiltable electric tricycle comprises: (a) a front frame, (b) a front fork mounted to the frame, (c) a front wheel with a hub motor, (d) a seat, (e) a steering handle bar, (f) a pair of laterally spaced rear wheels on a common axle, (g) a rear frame with a horizontal support element for the rear wheels and a shaft attached perpendicularly to the horizontal support element, (h) a pair of footrests, (i) a battery to power the hub motor; furthermore the front frame has a bottom tube oriented along an axis line pointing to the ground contact point of the front wheel and the shaft of the rear frame is inserted into the bottom tube of the front frame and thereby is rotatably connected to the front frame; furthermore the front frame has a horizontally oriented metal plate at the rear end of the bottom tube positioned above the support element of the rear frame to restrict the extent of tilting of the front frame relative to the rear frame, and when the front frame is tilted relative to the rear wheel support element to a certain extent, an end of the metal plate touches the rear wheel support element and thereby limit the extent of tilting of the front frame; furthermore the rear frame has two quick release clamps on the support element for securing the axle of the rear wheels and the axle of the rear wheels can be released quickly from the quick lease clamps so that the axle with two rear wheels can be separated from the rest of the tricycle for easy transportation.

2. The tiltable electric tricycle as in the claim 1, wherein the two footrests are rotatably connected to the base and can swing toward the rear of the tricycle to reduce the width of the tricycle.

3. The tiltable electric tricycle as in the claim 1 further comprises a locking mechanism to keep the front frame upright relative to the rear frame and the locking mechanism includes rotatable element on a post attached to the support element of the rear frame with an upper and a lower plates and when it is rotated toward the metal plate and oriented to have the metal plate positioned between the upper and the lower plates the metal plate is fixed to an upright position relative to the rear frame.

4. The tiltable electric tricycle as in claim 1, wherein the tricycle has two springs positioned between the metal plate of the bottom tube and the support element for rear wheels of the rear frame at two ends of the metal plate to exert a pressure force from two sides to keep the front frame to an upright position.

5. The tiltable electric tricycle as in the claim 1, wherein the tricycle two rotating element on the two ends of the support element of the rear frame and the rotating elements can be turned to be positioned below the metal plate and thereby to lock the front frame at an upright position.

6. A tiltable electric tricycle comprises: (a) a frame which comprises a head tube and a bottom tube, (b) a front fork mounted to the head tube of the frame, (c) a front wheel with a hub motor, (d) a seat, (e) a steering handle bar, (f) a pair of laterally spaced rear wheels on a common axle, (g) a support base with two quick release clamps for securing the axle of the rear wheels and the base has a shaft tube fitted into the bottom tube of the frame to connect to the frame rotatably, (h) a pair of footrests, (i) a battery to power the hub motor; furthermore the bottom tube points to the ground contact point of the front wheel; furthermore the frame has a horizontal oriented metal plate at the rear end of the bottom tube positioned above the support base plate of the rear wheels; and when the frame is tilted relative to the rear wheel support base, an end of the metal plate touches the rear wheel support base plate and thereby restricts the extent the frame can tilt; furthermore the axle of the rear wheels is secured to its support base using the two quick release clamps and can be released quickly from the quick release clamps so that the axle with two rear wheels can be separated from the rest of the tricycle for easy transportation; furthermore the two footrests are rotatably connected to a base and can swing rearwardly to reduce the width of the tricycle.

\* \* \* \* \*